United States Patent [19]

Fontaine

[11] Patent Number: 5,052,135

[45] Date of Patent: Oct. 1, 1991

[54] CONVERTIBLE GRASS CUTTING AND SNOW BLOWING MACHINE HAVING A CYLINDRICAL ROTOR

[76] Inventor: André G. Fontaine, 891 Paul-Emile Borduas, St-Hilaire, Quebec, Canada, J3H 3T8

[21] Appl. No.: 493,400

[22] Filed: Mar. 14, 1990

Related U.S. Application Data

[63] Continuation-in-part of Ser. No. 350,699, May 9, 1989, abandoned.

[51] Int. Cl.⁵ .............................................. E01H 5/09
[52] U.S. Cl. ...................................... 37/243; 37/244; 37/252; 37/259; 37/261; 56/11.1; 56/11.3; 56/294
[58] Field of Search ................. 37/243, 244, 247, 249, 37/251, 252, 256, 259, 260-262, 241; 56/11.1, 11.3, 11.6-11.7, 13.3, 249, 294

[56] References Cited

U.S. PATENT DOCUMENTS

| | | | |
|---|---|---|---|
| 1,439,832 | 12/1922 | Merrill | 37/243 X |
| 1,806,584 | 5/1931 | Borer | 37/243 X |
| 2,735,199 | 2/1956 | Wanner et al. | 37/243 X |
| 2,770,894 | 11/1956 | Gettleman | 37/243 X |
| 3,690,047 | 9/1972 | Thoen et al. | 37/243 X |
| 4,104,812 | 8/1978 | Stribiak, Jr. | 37/243 |
| 4,694,594 | 9/1987 | Thorud et al. | 37/244 |
| 4,787,195 | 11/1988 | Wenzel | 56/11.1 |
| 4,833,800 | 5/1989 | Ting | 37/243 |

*Primary Examiner*—Randolph A. Reese
*Assistant Examiner*—Franco S. De Liguori

[57] ABSTRACT

A convertible grass cutting and snow blowing machine which is supported on wheels and displaced on a surface where grass is to be cut or snow removed by a user controlling the machine from a handlebar. An engine is connected to the rotor housing which serves as a chassis, and has a drive shaft which is coupled to a rotor to impart axial rotation to the rotor. The rotor is supported between opposed side walls of a rotor housing, and is provided with at least two cutting blades secured longitudinally and spaced apart. The blades extend at a uniform height from the central axis of the rotor. Each of the blades defines a bow-shaped curve to direct grass cuttings or snow toward a mid-length region of the rotor when the rotor is rotatably driven and further, in combination with the rotor, impart a centrifugal force to direct the grass cuttings rearward toward an exit chute or snow upward toward a snow chute.

23 Claims, 8 Drawing Sheets

CONVERTIBLE GRASS CUTTING AND SNOW BLOWING MACHINE HAVING A CYLINDRICAL ROTOR

BACKGROUND OF INVENTION

This application is a continuation-in-part of parent application Ser. No. 07/350,699 filed May 9, 1989, now abandoned.

1. Field of Invention

The present invention relates to a convertible grass cutting and snow blowing machine which is operable by a combustion engine or an electric powered motor, and wherein a rotor, provided with blades, is utilized to efficiently mow grass, sweep leaves, and remove snow from the ground surface.

2. Description of Prior Art

Currently, machines are provided to mow grass, and separate machines are also provided to remove snow. Still further, machines are provided to remove leaves only. To date, snow blowing machines have not been as popular as lawn moving machines and mainly because of their high cost, seeing that they may only be used for a few hours of operation within the winter months. A further disadvantage of having two separate machines is that these require extra storage space and further maintenance.

Efforts have been made in an attempt to develop a machine that would serve both as a lawn mower and a snow blower, and examples of such machines are disclosed. for example, in U.S. Pat. Nos. 3,690,047 and 2,735,199. However, to date, such machines have not succeeded on the market place, and possibly not even been introduced because of various disadvantages, such as high weight, complex mechanism, large size, lack of safety and performance, and also possibly due to the lack of aesthetic appeal. For most people, these combined prior art machines would provide little, if any advantage, as compared with having two separate machines.

SUMMARY OF INVENTION

It is a feature of the present invention to provide a convertible grass cutting and snow blowing machine which substantially overcomes the above-mentioned disadvantages of the prior art.

Another feature of the present invention is to provide a convertible grass cutting and snow blowing machine which utilizes a rotor equipped with blades and capable of cutting grass or shoveling snow, and ejecting it in a particular predetermined direction, and with very little effort being required by the user of the machine.

Another feature of the present invention is to provide a convertible grass cutting and snow blowing machine which utilizes very few parts to effect the conversion, and wherein such conversion is easily effected by a non-skilled person.

Another feature of the present invention is to provide a convertible grass cutting and snow blowing machine which is lightweight, compact, simple to operate, and which may be operated by persons of both sexes, including adolescents.

Another feature of the present invention is to provide a convertible grass cutting and snow blowing machine having an improved control means which is operated by a single hand of the user.

According to the above features. from a broad aspect, the present invention provides a convertible grass cutting and snow blowing machine which comprises a rotor housing supported on wheels. An engine is secured to the rotor housing and has a drive shaft to impart axial rotation to a rotor supported by the housing. Handle means is provided to displace the machine on the wheels. The rotor is supported between opposed side walls of a rotor housing, and at least two cutting blades are secured longitudinally and spaced apart on the rotor shaft. The blades extend at a uniform height from the rotor axis and have an outer edge. Each of the blades defines a bow-shaped curve in at least the central portion thereof whereby to direct grass cuttings or snow toward a mid-length region of the rotor when the rotor is rotatably driven, and further, in combination with the rotor imparts a centrifugal force to direct the grass cuttings or snow toward exit chutes.

BRIEF DESCRIPTION OF DRAWINGS

A preferred embodiment of the present invention will now be described with reference to the example thereof illustrated in the accompanying drawings, in which.

DESCRIPTION OF PREFERRED EMBODIMENTS

Figure 1:
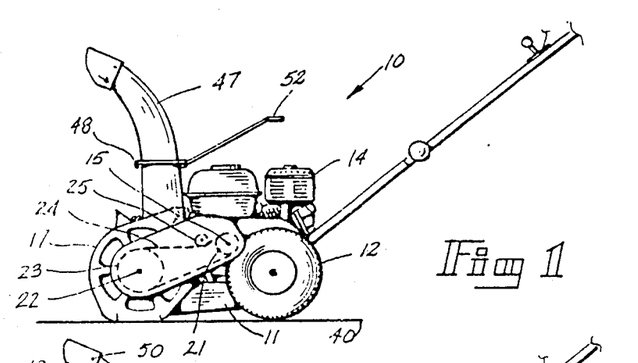
FIG. 1 is a side view of the convertible grass cutting and snow blowing machine when utilized as a snow blower.
Figure 4:
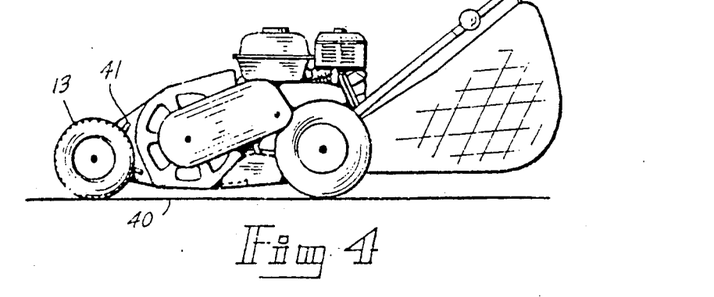
FIG. 4 is a side view similar to FIG. 3 showing the machine as a grass cutting machine.

Referring now to the drawings, and more particularly to FIGS. 1 to 6, there is shown generally at 10 the convertible grass cutting and snow blowing machine of the present invention. FIG. 1 shows the machine when converted as a snow blowing machine, while FIG. 4 shows the machine when converted as a grass mowing machine.

Essentially, the machine comprises a chassis frame 11 which serves as a grass chute. This chassis is supported on drive wheels 12, and a further set of front wheels 13 when converted as a grass cutting machine, as shown in FIG. 4. An engine 14 is mounted on the chassis 11 and has a drive shaft 15 (see FIG. 17), which imparts axial rotation to a rotor 16 (see FIG. 9), which is supported by the chassis, and attached to the rotor housing 17.

The rotor housing 17 (see FIGS. 10, 11, and 12) is comprised of a pair of side walls 18 and a rear wall 19 having a lower portion 20 which connects with the grass chute 11.

As shown in FIG. 1, the drive shaft 15 has a drive sheave 21 connected thereto. The rotor is provided with a driven shaft 22 (see FIGS. 1 and 9), which is coupled at one end to a drivable sheave 23. A drive belt is disposed about the drive sheave 21 and drivable sheave 23 to transmit the drive to the rotor. An adjustable tightener pulley 25 having a tightener lever accessible exteriorly to a drive cover housing 27 is provided for adjusting the tension in the drive belt.

Figure 5:
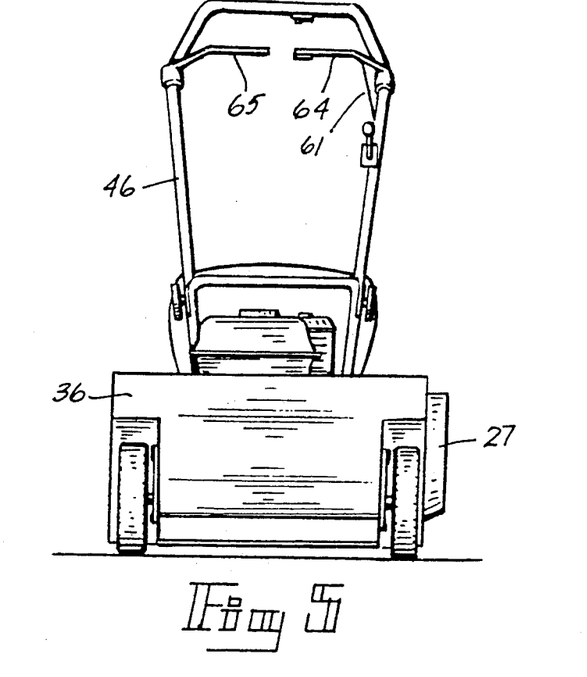
FIG. 5 is a front view of the machine when utilized as a grass mowing machine.
Figure 6:
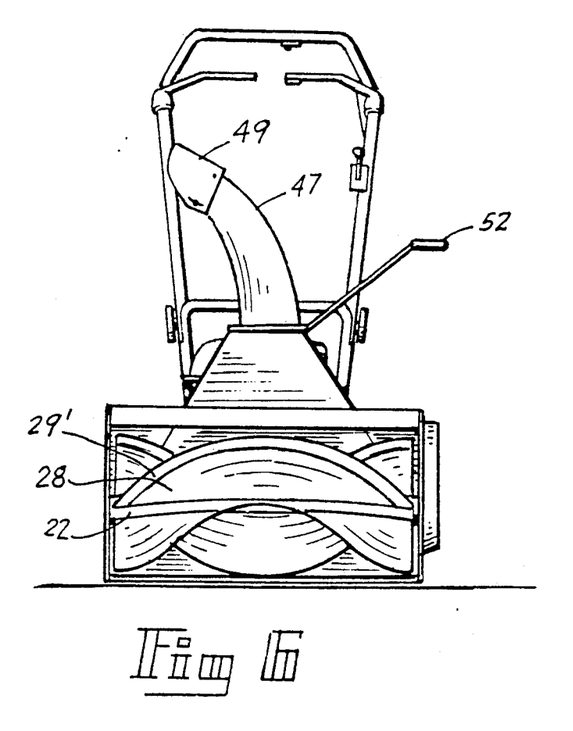
FIG. 6 is a front view illustrating the machine when utilized as a snow blowing machine.
Figure 7:
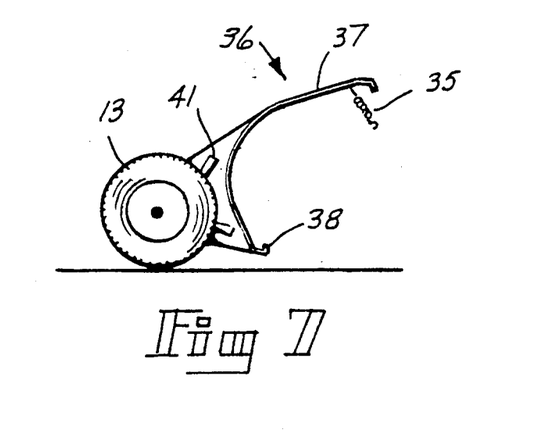
FIG. 7 is a side view showing the construction of the detachable front cover.
Figure 8:
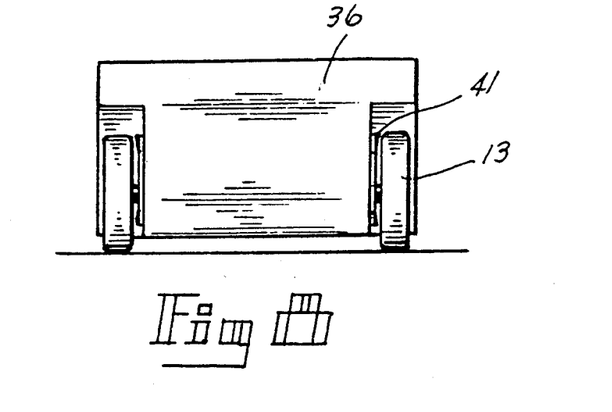
FIG. 8 is a front view of FIG. 7.
Figure 9:
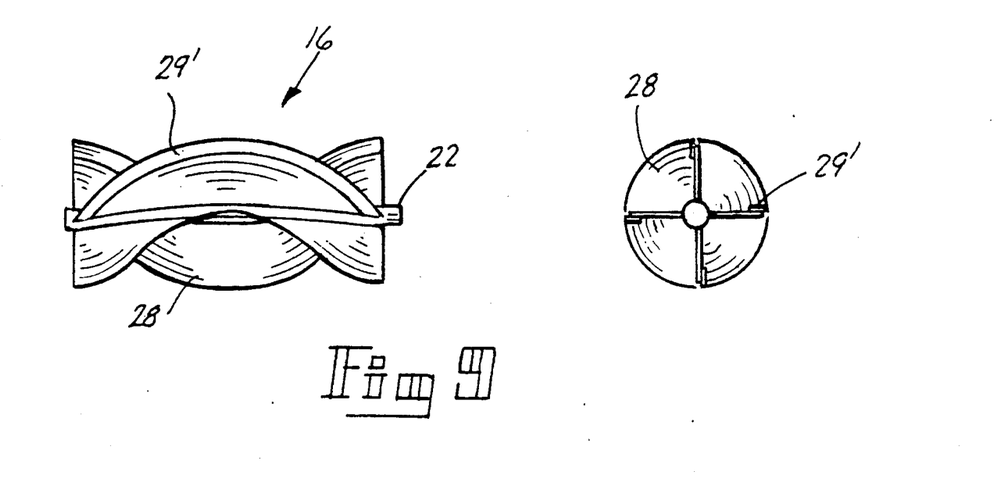
FIG. 9 is a front and side views of the rotor.

An important feature of the present invention is the construction of the rotor housing (see FIG. 10) which allows the machine to be easily converted and used as a lawn mower or a snow blower. Its rotor (see FIG. 9) is utilized very efficiently as a lawn cutting rotor and a snow hogging rotor. With reference to FIGS. 5, 6, and 9, the construction of the rotor will now be described. As herein shown, the rotor consists of a cylindrical body shaft having at least two blades, herein four diametrically opposed blades 28 secured longitudinally on the rotor shaft 22. These blades are formed from flat sheet metal, and are of substantially uniform width and thickness. At the outer edge of each blade 28 is secured an outer tip blade (see FIGS. 15 and 16), which has an angled outer edge extending in a frontward direction, whereby to cut grass, or cut through snow or hard-packed snow, and to project this grass or snow by centrifugal force either rearward (grass) or upward (snow). Also, these blades define a bow-shaped curve, as better seen in FIGS. 6 and 9, which is disposed at least in a central portion of the rotor. As herein shown, the bow-shaped curve extends from end to end of the rotor as a uniform curve. Although these blades seem to be distorted, as seen in FIGS. 6 and 9, this distortion is caused by the angle of viewing of their position on the rotor body, due to the fact that they are connected on the rotor shaft. There are four blades provided about the rotor, and diametrically aligned at right angles from one another. However, fewer or more blades could be provided about the rotor depending on the size of the rotor and other factors.

Figure 2:
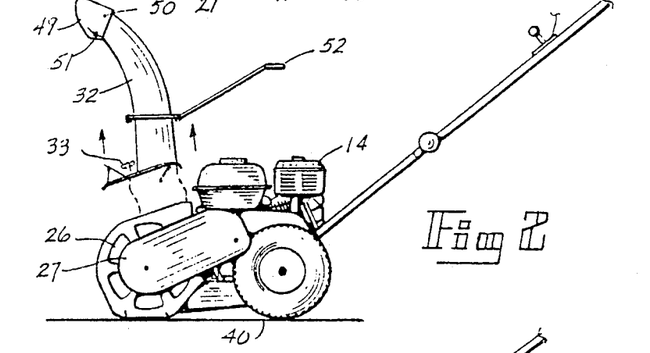
FIG. 2 is a side view similar to FIG. 1 but showing the snow blowing attachment in an exploded view.
Figure 3:
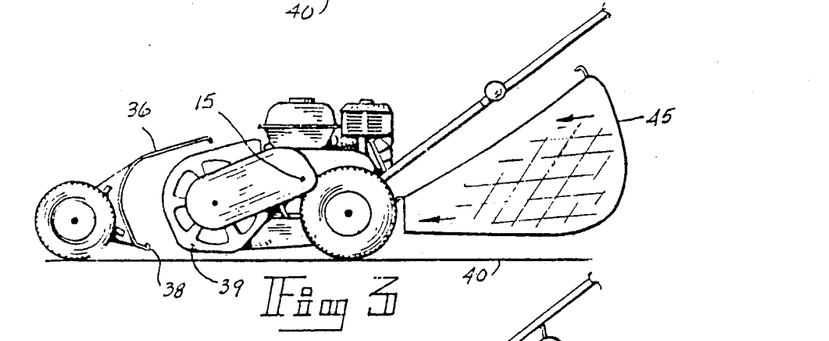
FIG. 3 is a side view of the convertible grass cutting and snow blowing machine when utilized as a grass mowing machine with its conversion parts shown in an exploded view.
Figure 10:
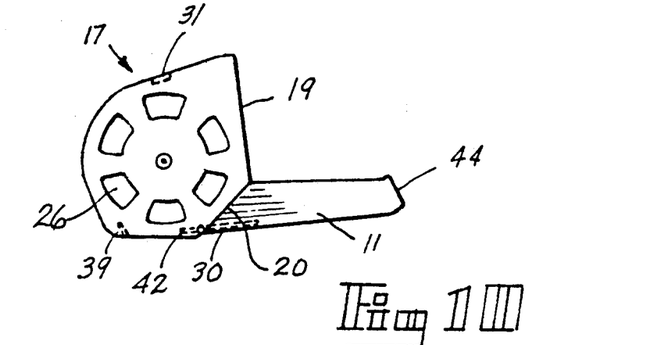
FIG. 10 is a side view of the construction of the rotor housing including the grass chute.
Figure 11:
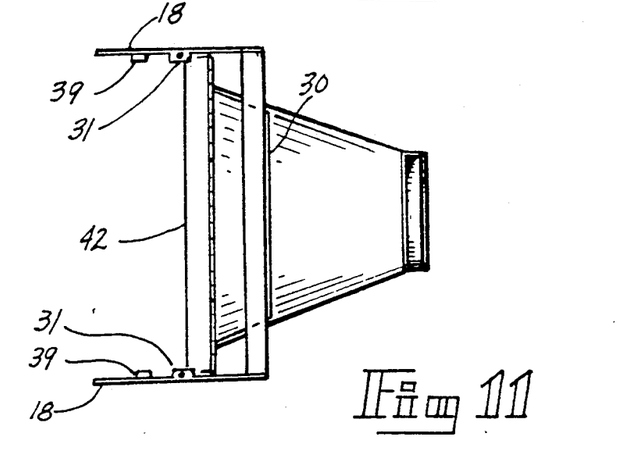
FIG. 11 is a top view of FIG. 10.
Figure 12:
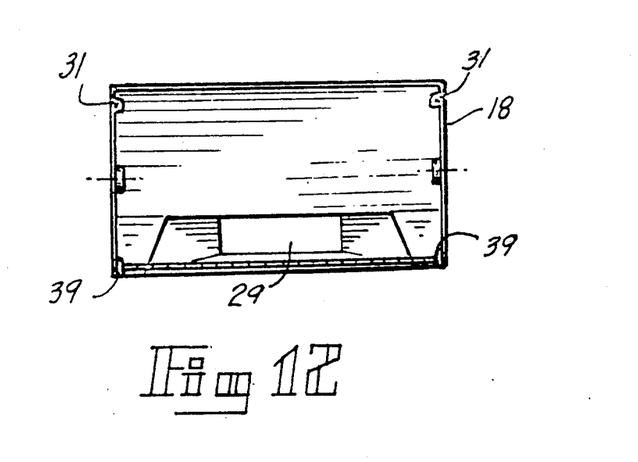
FIG. 12 is a front view of FIG. 10.
Figure 15:
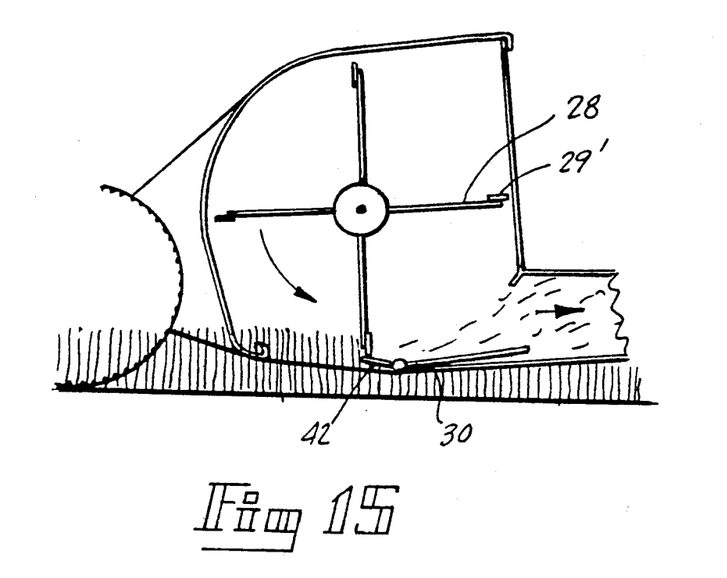
FIG. 15 is a cut view showing the rotor and the cutting blade operation when used as a lawn mower.
Figure 16:
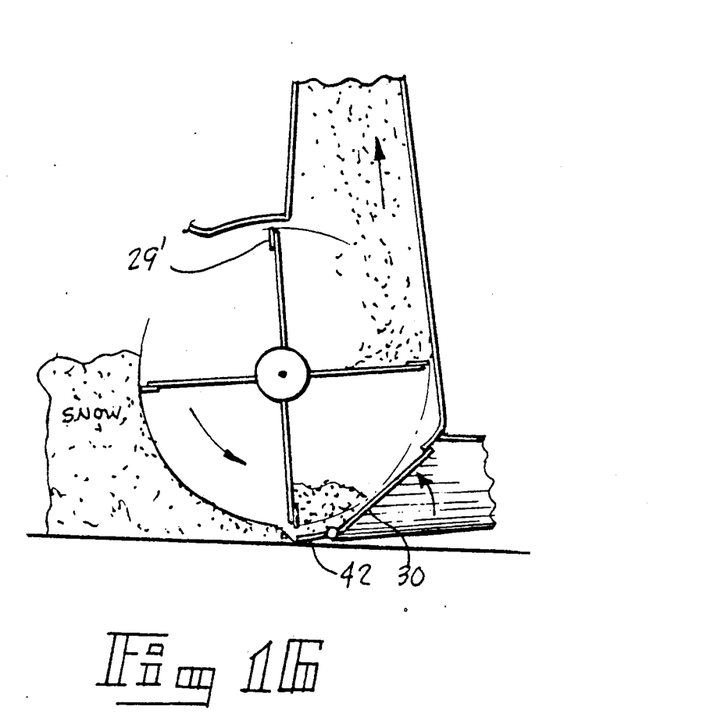
FIG. 16 is a cut view showing the rotor and the cutting blade that is used as a scraper blade when the machine is used as a snow blower.

Referring now additionally to FIGS. 2, 3, 7 and 8, there will be described the construction and operation of the conversion parts of the machine. The rotor housing as shown in FIGS. 10 to 12 is provided with opposed side walls 18 and a rear wall 19. A chute 11 (also used as a chassis) is secured to the rear wall 19. The chute 11 has an inlet 29 which is formed in the rear wall 20. A hinge gate 30 (see FIGS. 15 and 16) is secured on a hinge connection adjacent a lower edge of the inlet 29, and as shown in FIG. 15, it is lying in its open position. This is its position of use when the machine is utilized as a grass mowing machine. However, in the application of a snow blowing machine, the gate 30 is hinged upwardly and locked to block the opening 29 to present a substantially uniform rear wall 20 so that snow may be projected upwardly of the rotor housing, as will be described later. Connecting flanges 31 (see FIG. 11) are formed in the upper outer edge of the side walls 18 whereby to secure thereto the detachable snow chute assembly 32, as shown in FIG. 2. This assembly is attached to the rotor housing by wing nuts 33 only whereby to convert the machine to a snow blower. The front cover (FIG. 7), used to convert the machine to a lawn mower, is secured at the bottom by the folded portion 34 of the front cover. The top portion is secured by springs 35 attached to the rotor housing side 18. Accordingly, no skill is required to effect the conversion, and as can be seen, this conversion is effected very quickly and efficiently.

Referring now more specifically to FIGS. 3, 4, and 7 and 8, there will be described the construction of the detachable front cover assembly 36 to convert the machine to a lawn mower. The front cover assembly 36 comprises a metal shroud or cover 37 which fits over the front and top open end of the side walls 18 and interlock thereon by means of folded bottom part 38 secured to a lower portion of the shroud 37. The folded part 38 is detachably secured or received in guide slots 39 (see FIG. 3) provided in a front portion of a lower edge of the side walls 18 and retained therein. The front cover idle wheels 13 support the rotor housing elevated from the ground surface 40. The height adjustment of the blades from the ground surface is adjustable by moving up and down the lever 41. Such adjustment is well known in the art, as mentioned above.

Figure 13:
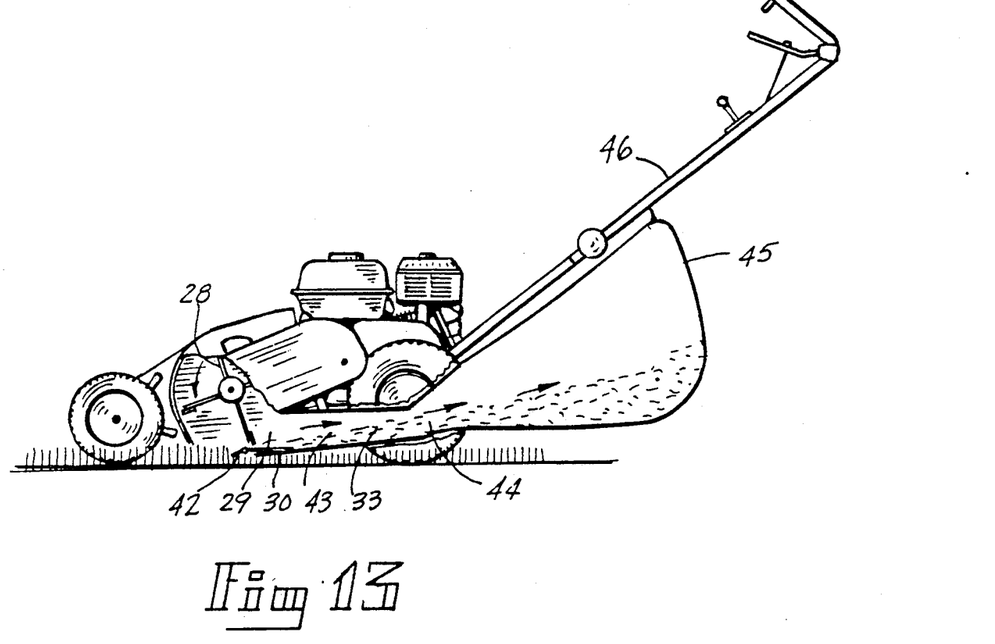
FIG. 13 is a side view, partly fragmented, of the machine shown in operation when used as a lawn mower.

As shown in FIG. 13, in the lawn mowing operation, the rotor 28 rotates in the forward direction, as indicated, and its edges pinch the grass against the cutting blade 42 (see also FIG. 15) and projects the grass cuttings 43 inwardly of the rotor and rearwardly by centrifugal force, and also by the air that is entering into the rotor housing by the side wall openings 26 and is pumped by the rotor that also acts as a centrifugal fan. The rotor also acts as a centrifugal fan to project snow upwardly through the snow discharge chute 32. These grass cuttings enter the chute 11 (chassis) through the chute inlet 29, and are ejected through the chute outlet end 44 into a bag 45 which is connected to the chute outlet and suspended by the handlebar 46. An advantage of locating the chute under the chassis is that the load of the grass cuttings is distributed substantially horizontally across the traction wheels 12 of the machine providing even better contact of the cutting blades with the grass, and providing a more safer operation than if the load was suspended on the side of the machine tending to imbalance the machine.

Figure 14:
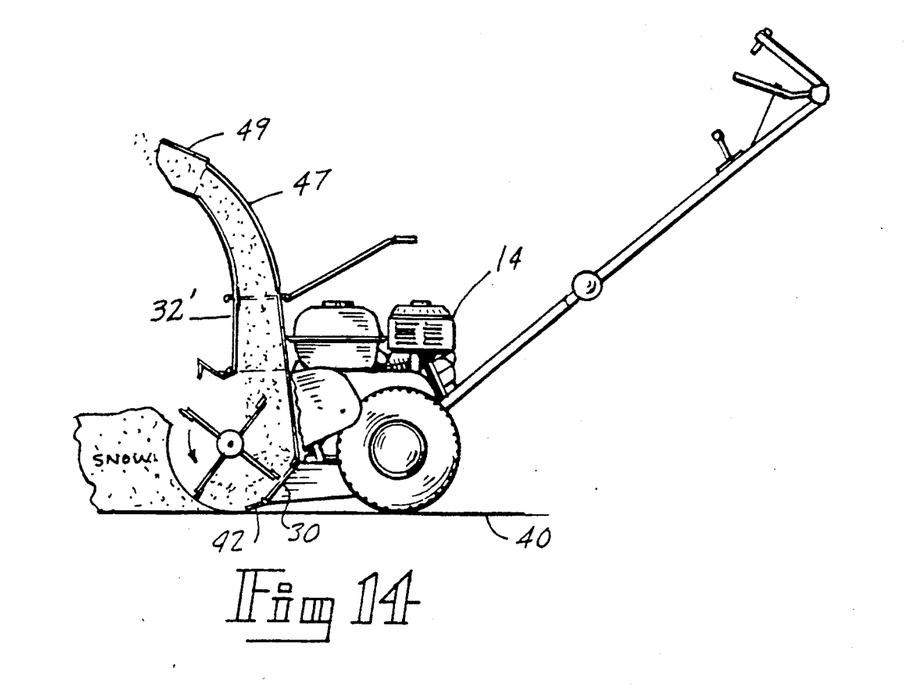
FIG. 14 is a similar view as FIG. 13, but showing the machine in operation as a snow blower.

Referring now to FIGS. 1, 2, and 14, there will be described the construction and operation of the snow chute assembly. The snow chute assembly consists of a connecting shroud 32' which is securable to a top portion of the rotor housing side walls 18, and back wall 19 as previously described. This shroud has a chute neck portion 47 extending from a top wall thereof, and centrally disposed over the rotor 28, as more clearly seen in FIG. 6. A rotatable angulated chute 47 is rotatably coupled to the neck by the coupling 48, and is provided with a chute deflector 49 at a top end thereof which is hinged thereto by hinge pins 50 and secured at a desired angle by the wing nut 51. A chute guide arm 52 can be moved laterally to rotate the snow chute 47 in order to direct snow in a desired direction. It is pointed out that with the rotor blade of the present invention, snow can be projected at distances nearly twice as far as the prior art snow blowing machines with a motor having the same horsepower. Accordingly, with this type of rotor mechanism it is possible to utilize motors which are less powerful than known prior art.

Figure 17:
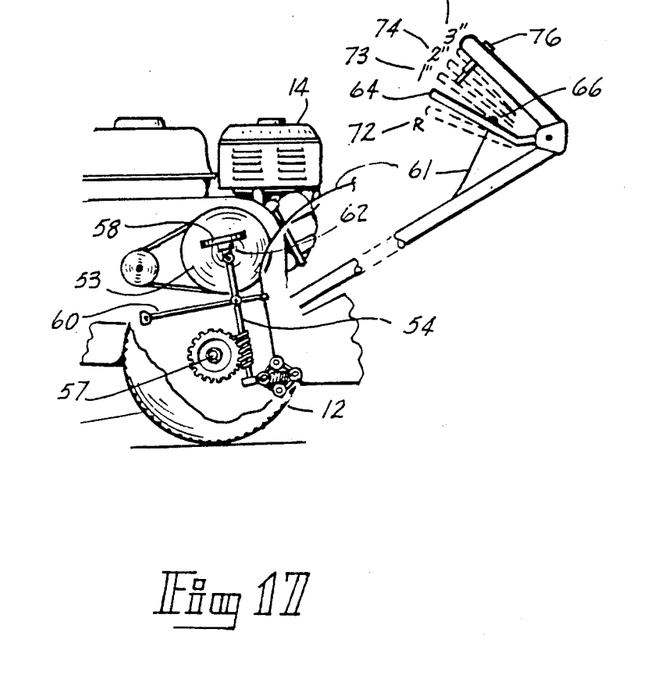
FIG. 17 is a fragmented side view showing the drive speed control mechanism.
Figure 18:
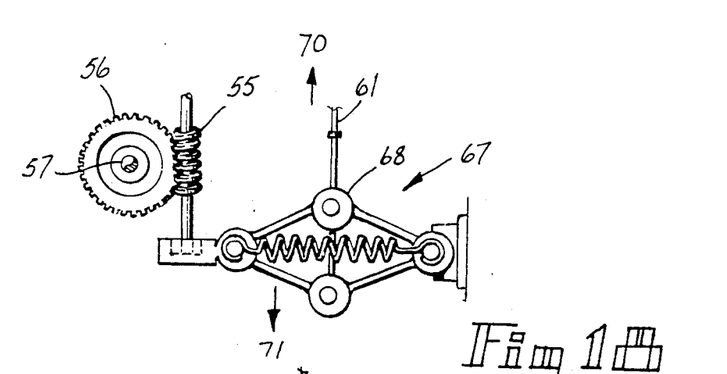
FIG. 18 is an enlarged view of the traction wheel drive coupling.
Figure 19:
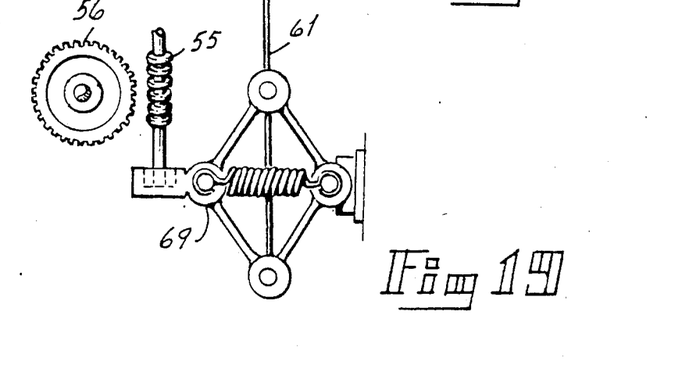
FIG. 19 is a view similar to FIG. 22 showing the drive coupling in the idle position.
Figure 20A:
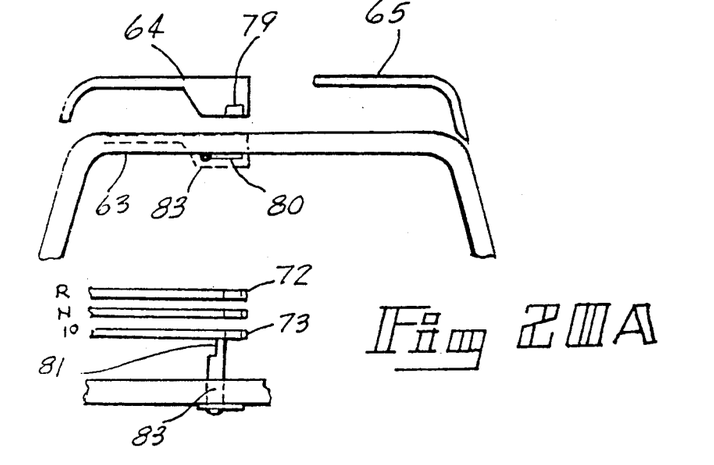
FIGS. 20A, B, and C represent a fragmented top view of the cross-bar of the handle showing the operation of the speed control and rotor clutch lever.
Figure 20B:
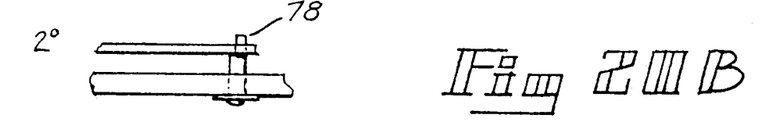
Figure 20C:
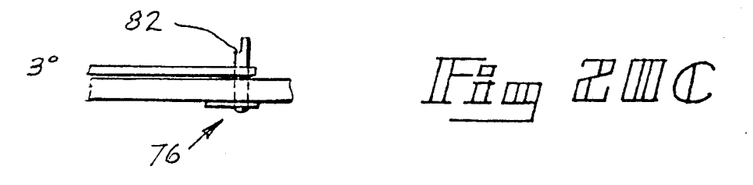
Figure 21:
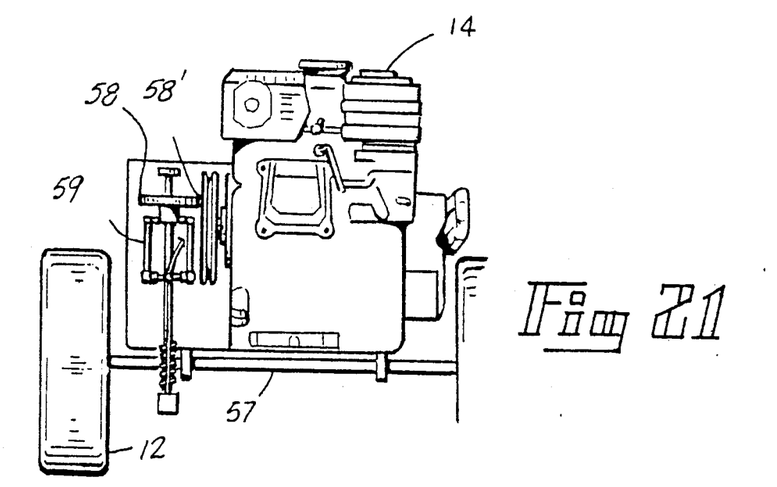
FIG. 21 is a rear view, partly fragmented, showing the operation of the traction disc and friction wheel.

Referring now to FIGS. 17 to 21, the drive and control mechanisms of the present invention is described. As previously described, the machine is provided with rear drive wheels 12. These drive wheels are coupled to the engine 14 by an adjustable clutch mechanism as seen in FIG. 17. A traction disc 53 is connected to the drive shaft of the engine, and has a traction outer surface. This traction disc is rotated by the drive shaft 15 of the engine. The clutch mechanism or the drive coupling consists of a drivable shaft 54 which is coupled at a lower end to a worm gear 55 which is in toothed engagement with a drive gear 56 connected to the wheel axle 57. The other end of the drivable shaft 54 is provided with a friction wheel 58 which is displaceable along a diametrical axis of the traction disc 53 by a displaceable linkage 59, which is operated by a single lever 60 secured to a cable 61. The outer edge 58' of the wheel 58 is in friction engagement with a traction face of the traction disc 53. As can be seen in FIG. 21, the traction disc 53 is provided with central cavity 62 formed in the traction surface and when the friction wheel outer edge 58' is aligned with the cavity there is no contact between the traction disc 53 and the friction wheel 58, thus imparting no drive to the drive wheels, and the machine is in an idle or neutral position. The adjustable clutch mechanism provides three forward drive speeds to the drive wheels, a neutral position, and a reverse by controlling the position of the friction wheel 58. The friction wheel is displaced by the displaceable linkage which is actuable by a single lever 60, and therefore by a single hand of the operator. As shown in FIG. 20, the cross handlebar 63 has the traction control lever 64 positioned adjacent one hand position, and a rotor clutch lever 65 adjacent the other hand position. The control cable 61 is secured to the single lever 64 by a convenient fastening means 66 which is easily adjustable and removable should the cable require replacement. The opposed end of the cable is connected to a spring-biased mechanism 67 which is more clearly illustrated in FIGS. 17 to 19. The spring-biased mechanism 67 comprises a first axial tension member 68, and a second transverse tensioning member 69. The first tensioning member provides tension forces when the cable is subjected to a pulling force in the direction of arrow 70. The second transverse tensioning member 69 provides tensioning forces when the cable is subject to a pushing force in the direction of arrow 71 when the friction wheel 58 is positioned to a reverse position corresponding to the lever position 72. When the lever 64 is positioned to the reverse position 72, the friction disc 58 is pulled downwardly by the linkage 59, and moves the disc below the cavity 62, and thus in the lower part of the traction disc where the friction disc starts rotating in the reverse direction due to the fact that the traction disc 53 is displaced from left to right.

Thus, the worm gear 55 has a reverse rotation thereon to impart a reverse rotation to the drive gear 56 and the drive wheel 12 although the disc 53 still rotates in the same direction.

When there is no pulling or pushing force on the lever 64, it is normally biased with the friction disc in its neutral position, as previously described. When the lever 64 is pulled to the positions 73, 74, and 75, the friction wheel 58 is displaced to three specific positions on the traction disc 53. When the wheel 58 is displaced in a direction towards the outer edge of the traction disc the friction wheel 58 rotates faster and thereby imparting a faster drive to the traction wheels, and increasing the speed of the machine. The machine therefore has three speeds depending on the position of the lever 64. These positions 73, 74, and 75 are guided by means of a speed changer control 76 which is better illustrated in FIGS. 20A, B, and C.

The speed changer control 76 is secured to the crossbar 63, and consists of a sliding guide post 83 having an abutment free end 78 coacting with the lever 64, and a cavity 79 provided in the lever whereby to restrict the displacement of the lever to the three different speed positions. A stepped notch 81 is formed in the guide post 83 and provides a support ledge 82 inwardly of the abutment free end 78. The sliding guide post 83 is connected to a slide 80 which is secured to the crossbar 63. The sliding guide post is positionable to three distinct positions corresponding to the first, second, and third forward drive speed positions 73, 74, and 75, respectively. The lever 64 abuts against the free end of the guide post when pulled thereagainst by a pulling force exerted by the forefingers of the left hand, in this particular case. The slide is operated by the thumb of the left hand. When the slide is in the first position 73, the friction disc rotates at a first lower speed. By displacing the slide 83 to its second position, as shown in FIG. 20B, the guide post enters the cavity 79 and the lever abuts against the ledge 82 of the notch 81. The lever is thus in the second speed position. When the slide is moved to its third position, the post is aligned with the slot, and lever is retracted against the crossbar 63, as shown in FIG. 20C, thus positioning the friction wheel in its third higher speed position.

It is pointed out that this adjustable clutch mechanism can be adapted to all sorts of machines which are engine-driven, and the characterizing feature thereof is that the drive can be clutched to the neutral, reverse, and forward drive position by a single hand, and without moving the hand from the handlebar. It is also within the ambit of the present invention to cover any obvious modifications of the preferred embodiment described herein, provided such modifications fall within the scope of the appended claims.

I claim:

1. A convertible grass cutting and snow blowing machine comprising an engine having a driveshaft; support means supported on wheels a rotor having an outer surface and a rotor shaft, said rotor defining a longitudinal axis; a rotor housing comprising opposed side walls; handle means to displace said support means on said wheels; gate means hingedly secured to said housing, said gate means being displaceable from a retracted position, where said machine is utilized as a grass cutting machine, to a locked position, where said machine is utilized as a snow blowing machine, and opening means on said opposed sidewalls for admitting air in the direction of said rotor, said engine being mounted on said support means, said driveshaft imparting axial rotation to said rotor, said rotor shaft being disposed between said opposed side walls of said rotor housing, said rotor having at least two rigid cutting blades having opposed ends and secured longitudinally and spaced apart thereon, each said blade having an outer cutting edge, said blades extending at a substantially uniform radial distance from said rotor axis, each said blade defining a bow-shaped curve from its opposed ends whereby to direct grass cuttings or snow toward a midlength region of said rotor when said rotor is rotatably driven, and further, in combination with said rotor, imparting a centrifugal force to direct said grass cuttings rearward through a rear chute in a lower portion of a rear wall of said housing or snow upwardly through a detachable snow chute attached to said rotor housing.

2. A convertible grass cutting and snow blowing machine as claimed in claim 1 wherein said blade outer cutting edge is an angled edge extending in a frontward direction.

3. A convertible grass cutting and snow blowing machine as claimed in claim 2 wherein there are four diametrically aligned blades spaced at right angles from one another about said rotor outer surface.

4. A convertible grass cutting and snow blowing machine as claimed in claim 1 wherein said rotor housing is an enclosed housing having a detachable front cover, and having a wheel axle adjustably secured to opposed ends thereof through an adjusting linkage, and a rear chute in a lower portion of a rear wall of said housing.

5. A convertible grass cutting and snow blowing machine as claimed in claim 4 wherein said detachable front cover is detachably secured in guide slots provided in a front portion of a lower edge of said housing side walls, and retained therein by securing said front cover to said housing side walls.

6. A convertible grass cutting and snow blowing machine as claimed in claim 5 wherein said front cover is secured to said housing side walls by extension springs and threaded fasteners.

7. A convertible grass cutting and snow blowing machine as claimed in claim 6 wherein said threaded fasteners are wing nuts, there being a pair of wing nuts secured to an outer edge of each said side wall.

8. A convertible grass cutting and snow blowing machine as claimed in claim 4 wherein said chute is disposed under said chassis and extends between said wheels, and a catcher bag secured to said chute rearwardly of said machine.

9. A convertible grass cutting and snow blowing machine as claimed in claim 1 wherein said rotor housing has an open front end, and said machine comprises a detachable snow chute assembly detachably secured between said rotor housing side walls in a top portion of said housing, said housing having a rear wall formed with a straight lower portion.

10. A convertible grass cutting and snow blowing machine as claimed in claim 9 wherein said chute assembly has a connecting shroud in a lower portion thereof securable to said side walls by threaded fasteners, a chute neck extending upwardly from said shroud, a rotatable angulated chute rotatably coupled to said neck, and a chute guide mechanism to axially rotate said chute neck to a desired position.

11. A convertible grass cutting and snow blowing machine as claimed in claim 10 wherein there is further provided a chute deflector hinged adjacent a top open end of said chute neck, and means to adjust the angle of said deflector.

12. A convertible grass cutting and snow blowing machine as claimed in claim 1 wherein a detachable snow chute assembly is detachably secured to said side walls with said detachable front cover removed therefrom when said gate means is in said locked position to utilize said machine as a snow blowing machine.

13. A convertible grass cutting and snow blowing machine as claimed in claim 4 wherein said chute assembly and said front cover are provided with fastening holes to receive fasteners therein for securement to an outer edge of said housing side walls, said fastening holes of said chute assembly and said front cover being aligned with the same fastening holes provided in said outer edge of said housing side walls.

14. A convertible grass cutting and snow blowing machine as claimed in claim 1 wherein said engine drive shaft has a drive sheave connected thereto, said rotor having a driven shaft having a drivable sheave connected thereto, a drive belt about said drive sheave and drivable sheave, an adjustable tightener pulley engageable with said drive belt, and a tightener lever accessible exteriorly of a drive cover for adjusting the tension of said drive belt.

15. A convertible grass cutting and snow blowing machine as claimed in claim 1 wherein there is provided at least one set of drive wheels, and control means to control the rotational drive to said drive wheels, said control means comprising a single lever operated mechanisms.

16. A convertible grass cutting and snow blowing machine as claimed in claim 15 wherein said single lever operated mechanism comprising a traction disc coupled to a drive coupling having a drivable shaft coupled at one end to a gear secured to an axle of said drivable shaft and displaceable along a diametrical axis of said traction disc by a displaceable linkage operated by said single lever, said friction wheel having a peripheral outer edge in contact with said traction disc.

17. A convertible grass cutting and snow blowing machine as claimed in claim 16 wherein said drivable shaft is provided with a worm gear which is in toothed engagement with said gear secured to said axle of said drive wheels.

18. A convertible grass cutting and snow blowing machine as claimed in claim 17, wherein said traction disc is a circular disc having a flat traction surface, a central cavity in said traction surface, said friction wheel when aligned with said cavity being out of contact with said traction surface and assuming a non-driving state of the machine.

19. A convertible grass cutting and snow blowing machine as claimed in claim 18 wherein a control cable is secured at one end to said single lever and at an opposed end to a spring-biased mechanism, said lever being a pivotal lever, said displaceable linkage being connected to said control cable at a position where said friction wheel is at a neutral position and there is no pulling force on said lever.

20. A convertible grass cutting and snow blowing machine as claimed in claim 19 wherein a speed changer control is secured to said handle means and positioned adjacent said single lever, said speed changer being a sliding guide post having an abutment free end coacting with a cavity in said lever to restrict the displacement thereof to displace and position said friction disc at a precise position on said diametrical axis of said traction disc whereby to control the rotational speed of said friction disc and said traction wheels.

21. A convertible grass cutting and snow blowing machine as claimed in claim 20 wherein said abutment free end of said guide post is provided with a stepped notch to provide a support ledge inwardly of said abutment free end, said sliding guide post being connected to a thumb operated slide secured to a crossbar of said handle means, said slide being positionable to three distinct positions corresponding to a first, second, and third forward drive speed position, said lever abutting against said free end of said guide post when pulled thereagainst, said lever abutting against said support ledge of said notch with said free end portion of said post extending into said cavity in said lever when said slide is in said second position, said slide when in said third position aligning said post to enter said cavity, thereby permitting maximum forward displacement of said cable and said friction disc on said diametrical axis.

22. A convertible grass cutting and snow blowing machine as clailmed in claim 19 wherein said spring-biased mechanism comprises a first axial tensioning member and a second transverse tensioning member, said first tensioning member providing tensioning forces when said cable is subjected to a pulling force, said second transverse tensioning member providing tensioning forces when said cable is subjected to a pushing force.

23. A convertible grass cutting and snow blowing machine as claimed in claim 22 wherein said single pivotal lever when displaced forwardly away from a cross handlebar of said handle means retracts said friction disc to an opposed radius on said diametrical axis to cause said friction disc and said drive wheels to rotate in a reverse direction.

* * * * *